Nov. 5, 1929.   J. M. WEED   1,734,932
WELDROD AND METHOD OF MAKING THE SAME
Filed Oct. 27, 1927
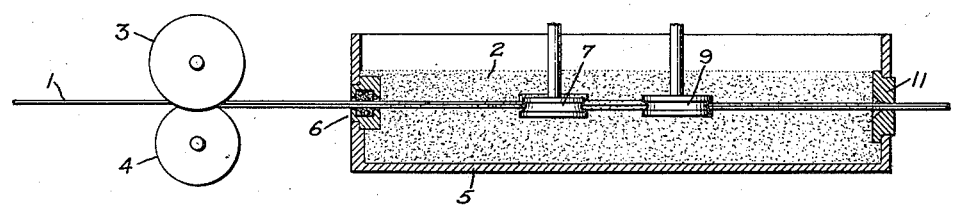
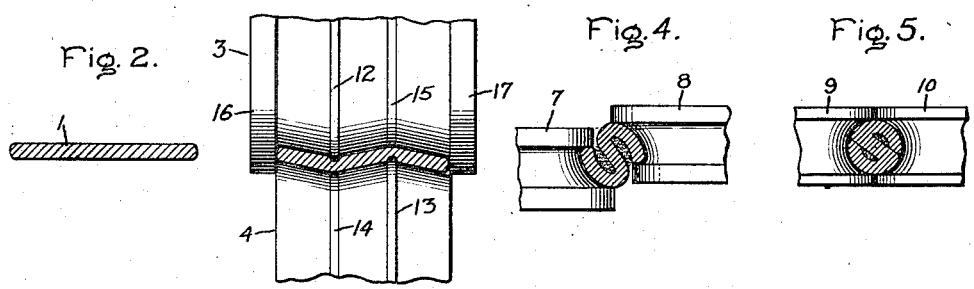
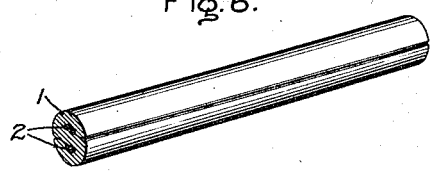
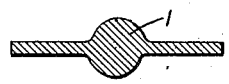   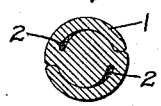
Inventor:
James M. Weed,
by *Alexander S. Lentz*
His Attorney.

Patented Nov. 5, 1929

1,734,932

UNITED STATES PATENT OFFICE

JAMES M. WEED, OF BALLSTON LAKE, NEW YORK, ASSIGNOR TO GENERAL ELECTRIC COMPANY, A CORPORATION OF NEW YORK

WELD ROD AND METHOD OF MAKING THE SAME

Application filed October 27, 1927. Serial No. 229,252.

My invention relates to improved weldrods particularly adapted for metallic arc welding. My invention also relates to a method of making my improved weldrods.

It is frequently necessary or desirable to incorporate with metallic arc welding weldrods or electrodes certain materials for increasing the stability of the arc, for giving more uniform fusion and smooth flowing characteristics to the electrode, and for improving the quality of the deposited metal in the weld. Materials for improving the quality of the metal may include chemical reagents, fluxing materials as understood in steel furnace practice, or alloying elements. All of these materials for whichever purpose intended will be herein classed together and designated by the term flux.

If a flux is coated on the exterior of an electrode, it interferes with the conduction of the welding current into the electrode, or makes it necessary to remove the flux to enable the current to enter. Such electrodes are dirty to handle, and the flux is liable to flake off and be lost under conditions of transportation and use. Such electrodes are unsuitable for use in automatic welding machines in which an indefinite length of the electrode is fed to the arc while current is fed through a contact engaging its surface. Some of these objections apply also, to a more limited extent, when the flux is inserted in one or more grooves on the surface of the electrode. These various disadvantages have been eliminated in electrodes of the type disclosed in my Patent No. 1,525,840 granted February 10, 1925, and assigned to the same assignee as the present case.

The mechanical arrangement employed for enclosing flux within an electrode is important as the structure of the electrode affects the stability of an arc maintained at its terminal. Thus an electrode having a single seam or a plurality of unsymmetrically disposed seams will be found to have an erratic behavior due to the effect of the seam or seams on the arc. This effect can be best understood by considering an electrode having a single seam. Current flowing through such a rod will generate a magnetic flux in the rod which due to the high reluctance of the seam will be forced for the most part out of the rod at the seam into the air as a magnetic tuft. This tends to cause any drops of molten metal forming on the tip of the electrode to fly off in the opposite direction from the seam. If the seam is in front of the electrode in the direction of its travel over the work this will have no detrimental effect as the drops will be thrown into the molten pool in the work formed by the arc and incorporated in the weld but if the seam is in any other position the drops will be thrown away from the molten pool and distributed on the surface of the work outside of the weld. When, therefore, such a seamed electrode is fed through an automatic machine where the position of the seam cannot be accurately controlled, the welding operation will at times be unsatisfactory due to the action of this seam on the arc.

In electrodes of the cored type which comprise two distinct metallic portions, one being in the form of a shell or sheath and the other in the form of a wire or core enclosed within the sheath, the flux is enclosed between the sheath and the core.

One object of the present invention is to produce an electrode having the advantages of electrodes of the cored type, but formed from a single metallic strip or portion, so that the welding current supplied to the exterior of the electrode may readily distribute itself throughout the electrode thereby avoiding any possibility of the core becoming more or less insulated from the sheath.

Another object of my invention is to provide an electrode having a plurality of oppositely disposed seams by reason of which the magnetic disturbances caused by the seams when current is flowing through the electrode are balanced against one another and the arc thereby stabilized during the welding operation.

Another object of my invention is to produce an electrode having the advantages described which will be simple and more cheaply manufactured than electrodes of the cored type, and which will be subject to quantity production while maintaining a high degree of uniformity in the manufactured product.

A further object of my invention is to provide an efficient method of manufacturing this electrode.

Other objects of my invention will appear from the following description taken in connection with the accompanying drawing and the scope of my invention will be pointed out in the appended claims.

Referring to the accompanying drawing Fig. 1 illustrates one method of manufacturing my improved electrode shown in Fig. 6, and Figs. 2, 3, 4 and 5 are detail views showing progressive stages in the operation of manufacturing the electrode. Fig. 8 shows an alternative form which my electrode may assume when made from a strip of the section shown in Fig. 7.

The electrode shown in Figs. 6 and 8 comprises a strip 1 folded upon itself into a tube having a closed S section with a flux 2 enclosed in the two folds as illustrated.

My invention, as far as the electrode itself is concerned, is not limited to any particular method of manufacture but I prefer to make the electrode by folding by means of rolls or by drawing through suitable dies a strip of the desired electrode metal while inserting within the folds of the rod previous to their closure the desired welding flux. In Fig. 1 I have shown apparatus for carrying into effect this method of manufacture.

As shown in Fig. 1, a strip 1 of suitable electrode metal, after being creased or broken by rolls 3, 4, is introduced into a box or tank 5 through a packing 6 where, through the action of rolls 7, 8 and 9, 10, it is folded upon itself and formed into a tube of special shape in a bath of flux 2 a part of which is enclosed within the folds of the tube during the forming operation. The flux may be inserted in any other suitable manner. The electrode is finally finished by a die 11 through which it is drawn from the box 5. At the same time die 11 wipes the flux from the external surface of the electrode. The strip 1 may be prepared by rolling flat a rod or wire of suitable size. It is not necessary to use edging rolls on the strip thus formed as I consider it advantageous to have the strip with rounded edges which cause less wear on the shaping rolls or dies. The strip may or may not be coated with a second metal or other substance that may be found desirable to introduce into the welding arc or weld metal.

The breaking rolls 3 and 4 are of complementary shape, each being provided with ribs 12 and 13 and flat grooved portions 14 and 15 opposite these ribs. The rolls as a whole crease the strip longitudinally in a manner to permit the subsequent forming operation to be performed easily. It will be noted that the ribs 12 and 13 form indentations in the material which reduce its cross section and thus weaken the strip and make it easier to bend at these points during the subsequent forming operation. By reason of this redistribution of the metal it is easier to form the folds within which the flux is enclosed. Either roll may be provided with flanges 16 and 17 to retain the strip 1 centrally between the rolls.

The rolls 7 and 8 partially close the strip upon itself as is illustrated in Fig. 4. The configuration of these rolls is such as to cause this action and is best disclosed by the illustration. After leaving rolls 7 and 8 the strip is closed upon itself by rolls 9 and 10 into a round rod or tube and the final finish is given to the rod by the die 11. It is to be understood, however, that the rolls 3—4, 7—8, and 9—10 might be replaced by suitable dies, and with certain metals and fluxes this will be the preferred method of manufacturing the electrode. It is also to be understood that a packing might replace the die 11 for wiping the flux from the external surface of the electrode while the final finishing operation is performed either by rolls 9—10 or by an additional set of rolls external to the tank 5.

Instead of a flat strip as shown in Fig. 2 I may use a strip such as shown in Fig. 7. Such a strip may be formed by rolling a rod or wire between grooved rolls. When such a strip is folded into an electrode according to my invention a rod of the section shown in Fig. 8 is obtained. In this rod as in the rod of Fig. 6, it will be noted that a flux 2 is enclosed within the two folds of the strip 1 from which the rod is made.

While my invention is of peculiar utility for electrodes for electric arc welding, it is to be understood that it is not limited in its application to electrodes forming a terminal of an electric source, since a weldrod according to my invention may be used as a filler rod in gas welding and in arc welding where the arc is used as the source of heat and maintained by electrodes independently of the weldrod.

While I have described a particular embodiment of my invention and certain apparatus for carrying out my method, it will be obvious to those skilled in the art that various modifications may be made without departing from my invention and I therefore desire in the appended claims to cover all such modifications as fall within the spirit and scope of my invention.

What I claim as new and desire to secure by Letters Patent of the United States is:—

1. An internally fluxed weldrod of the cored type comprising a single metallic strip whose two edges engage opposite sides of a central portion thereof constituting a core with which they form a plurality of oppositely disposed seams.

2. A weldrod of the cored type comprising a metallic strip whose two edges engage opposite sides of a central section thereof with which they form a plurality of oppositely disposed seams recesses and a flux enclosed between the inside surfaces of the strip.

3. An electrode comprising a metallic strip the edge portions of which constitute a tube longitudinally divided internally by a part of the strip with which the edge portions form oppositely disposed seams and a flux enclosed within the inside surfaces of the strip.

4. An electrode for metallic arc welding comprising a metallic strip of substantially S shaped section with the seams oppositely disposed to one another and a flux enclosed within the electrode.

5. A bare electrode for metallic arc welding comprising a metallic strip the cross section of which is of the shape of a closed S with the seams between the parts thereof oppositely disposed to one another, and a flux enclosed within the inside surfaces of the strip.

6. The method of making a fluxed weldrod which comprises folding a strip of material longitudinally upon itself into an S shaped section and inserting a flux in the folds thus formed.

7. The method of making an electrode which comprises creasing a strip of metal along its length in opposite directions along opposite sides of its center line, folding the edges of said strip upon the central portion formed by said creases to form an S section, inserting a flux into the folds of said S section and closing said section upon itself to enclose the flux within the electrode.

8. The method of making an electrode which comprises folding a strip of material longitudinally upon itself into a cylinder of S shaped section in a bath of flux and closing said S section upon itself in said bath to enclose the flux included in the folds of the S section within the strip.

9. The method of making an electrode which comprises folding a strip of material longitudinally upon itself into an S section with the folds thus produced on opposite sides of the electrode and filling said folds with a flux.

10. The method of making an electrode in the form of a tube of metal enclosing flux which comprises folding the edge portions of a strip upon its central portion producing a closed tube divided longitudinally into two parts by said central portion of the strip while maintaining the folding mechanism submerged in a bath of the flux to be enclosed within the electrode.

11. An internally fluxed electrode of the cored type having a plurality of oppositely disposed seams extending along its length.

In witness whereof, I have hereunto set my hand this 26th day of October, 1927.

JAMES M. WEED.

CERTIFICATE OF CORRECTION.

Patent No. 1,734,932.                          Granted November 5, 1929, to

JAMES M. WEED.

It is hereby certified that error appears in the printed specification of the above numbered patent requiring correction as follows: Page 3, line 15, claim 2, strike out the word "recesses"; and that the said Letters Patent should be read with this correction therein that the same may conform to the record of the case in the Patent Office.

Signed and sealed this 24th day of December, A. D. 1929.

M. J. Moore,
Acting Commissioner of Patents.

(Seal)